United States Patent [19]

Hilleby

[11] Patent Number: 4,884,393
[45] Date of Patent: Dec. 5, 1989

[54] CONVEYOR SYSTEM FOR USE PARTICULARLY WITH HARVESTERS

[76] Inventor: Hakan K. Hilleby, 31 Palm Ave., Woodland, Calif. 95695

[21] Appl. No.: 136,958

[22] Filed: Dec. 23, 1987

[51] Int. Cl.$^4$ .................................... A01D 46/00
[52] U.S. Cl. .................. 56/327.1; 56/328.1; 198/834; 198/844
[58] Field of Search .............. 56/328.1, 327.1, 364, 56/13.9, 49; 198/814, 817, 832, 834, 844, 847, 799, 803.3; 209/685; 474/202–204, 249–252

[56] References Cited

U.S. PATENT DOCUMENTS

| | | | |
|---|---|---|---|
| 2,799,177 | 7/1957 | Henson | 198/847 |
| 4,072,062 | 2/1978 | Morling et al. | 198/834 |
| 4,262,750 | 4/1981 | Merkley et al. | 56/327.1 |
| 4,569,188 | 2/1986 | Alper et al. | 56/327.1 |
| 4,741,432 | 5/1988 | Dekko | 474/204 |

FOREIGN PATENT DOCUMENTS

| | | | |
|---|---|---|---|
| 103950 | 6/1982 | Japan | 474/204 |
| 1230519 | 5/1986 | U.S.S.R. | 56/327.1 |

*Primary Examiner*—John Weiss
*Attorney, Agent, or Firm*—Bernhard Kreten

[57] ABSTRACT

A conveyor system used in fruit or crop harvesters to facilitate separation of the fruit or crop vine from the fruit or crop including a plurality of laterally spaced conveyor belts having an inner surface contoured with merlons and crenels to be engaged by a drive shaft having complimentally formed teeth and gaps to drive by meshing engagement with the merlons and crenels. The conveyor belt is formed as a closed loop including a plurality of idler rollers and a tensioning roller which with the drive shaft forms a closed loop. The interrelationship of the belt and the drive shaft preclude vine or organic matter build-up to minimize belt slippage and synchronous movement of all the belts.

34 Claims, 2 Drawing Sheets

CONVEYOR SYSTEM FOR USE PARTICULARLY WITH HARVESTERS

FIELD OF THE INVENTION

The following invention relates generally to a conveyor belt system having primary use in the agricultural harvesting industry. More particularly, the conveyor belt to be described is formed from a plurality of discrete separated belts spaced a sufficient distance, one from the other, to allow the through passage of the agricultural product harvested between the belts. At the same time, the series of spaced belts are configured to remove a mass of vines associated with the food product so that the vines are carried away from the harvested food and are typically returned to the acreage already harvested.

BACKGROUND OF THE INVENTION

The success of a farming operation requires attention to certain essentials during the course of the year. For example, planting at the proper time, controlling insects and various blights as well as proper irrigation involve considerable skill. This determines to a certain degree whether or not a particular crop will warrant harvesting. However, once a crop is ready for harvest, the farmer must rely upon the performance of his harvesting equipment in order to assure that maximum production has been extracted from the field.

Typically, when harvesting is performed in extremely fertile regions of the country, for example California, the harvesting operation proceeds 24 hours a day for an extended period of time, perhaps several weeks. This truly is the most critical time in the farmer's growing cycle, since delays in harvesting can mean a lost crop, particularly because agricultural produce must be harvested within a relative small time frame.

In the tomato industry, harvesting equipment is dormant 10 months of the year. Although the equipment has been reconditioned so that it performs reliably for the entire harvest period of perhaps 2 months, the tomato crop can be lost and workers hired to attend the harvesting equipment will remain idle if repairs must be effected.

Understandably, the harvesting equipment is only as reliable as its weakest element. Heretofor this weakness has existed in the conveyor belts which perform various functions. While some belts direct the harvested fruit to sorting operations both by band and optically, other conveyors remove the debris and vines associated with the harvested tomatoes for disposal on the harvested terrain. One particular series of belts which carries vines away from the machine and allows the tomatoes to pass through the belt has heretofore been a chronic source of breaking, slipping, or stretching which tends to stop the harvesting operation until repairs can be effected. Inefficiency at this stage of the harvesting operation is extremely detrimental, since failure to efficiently harvest the fruits of one's labor directly impacts on the financial success of the farmer.

Most conveyors for harvesting equipment specifically directed to separating fruits or vegetables from a massive vine growth have heretofor relied on conventional pulley systems and belts having outwardly extending fingers which are intended to entrain the mass of vines, carrying them away for discharge onto the terrain, while tomatoes pass between spaced conveyor belts. Since these belts are driven by friction, heat generation can cause glazing on the driven surfaces reducing the coefficient of friction and the ability of the belts to be driven. Stretching, fracturing and failure to operate in synchrony with other adjacent belts result in the vines becoming entrained on a conveyor belt drive shaft causing premature belt failure and jumping of the belt off its associated drive pulley.

SUMMARY OF THE INVENTION

The instant invention is distinguished over the known prior art in that belts and their drive elements which are of conventional manufacture by existing farm machinery manufacturers are replaced by a new type of belt which is substantially impervious to the types of failure experienced on the conventional belts. This new type of belt renders substantially less frequent the need for in field repairs during the harvest Thus, workers hired to tend the machines are kept productive during the entire harvesting cycle. Moreover, the farmer benefits not only by keeping his workers productive, but by obviating the need for repairs to the equipment itself. Thirdly, the entire process of harvesting has been rendered more efficient which increases the yield which the farmer can extract from his given acreage, thereby promulgating efficiency.

Stated succinctly, the instant invention provides a conveyor belt having an inner surface and an outer surface. The inner surface is characterized as having a plurality of rubber cletes which coact with cogs on one drive roller to allow positive translation of the belt irrespective of any possible entrainment of vines between the belt and the drive roller. This negates the effects of stretching and glazing on the drive surface of the belt. The exterior of the belt is provided with a plurality of outwardly extending resilient fingers which entrain the vines associated with the fruit being harvested. The fingers carry the vines to a remote site for discharge on the terrain. A plurality of belts are ganged to operate in concert each spaced from another so that tomatoes or other fruits and vegetables can pass between adjacent the belts to a conveyor therebelow for passage to subsequent stations The belt is formed as a laminate which is reliably spliced together. The splice detail allows overlap for end portions of the same belt for reliability and security.

OBJECTS OF THE INVENTION

Accordingly, it is a primary object of this invention to provide a new and useful conveyor belt for use with harvesting equipment.

It is a further object of this invention to provide a device as characterized above which is effective over a longer period of time when compared to known prior art belts so that one harvesting crops can proceed continuously throughout the entire harvest without mechanical breakdown with respect to these belts.

A further object of this invention contemplates providing a device as characterized above in which means for driving the conveyor belt is brought about in a positive manner by contouring the drive surface of the belt in a saw tooth configuration. More particularly, the saw tooth configuration employs a series of merlons and crenels and the drive shaft is contoured with cogs spaced complimentally with respect to the merlons and crenels on the drive belt to provide a positive driving force which ignores any possible entrainment of vines therebetween.

A further object of this invention contemplates providing a device as characterized above which is extremely durable in construction, extremely safe to use, and lends itself to mass production techniques.

A further object of this invention contemplates providing a device as characterized above in which any belt stretching that may occur is accounted for, so that positive drive is maintained at all times.

A further object of this invention is to provide a device as characterized above in which a plurality of the above described conveyor belts work in concert and are ganqed together on a single drive shaft having peripherally extending cogs to drive all of the belts in a synchronous manner.

A further object of this invention contemplates providing a device as characterized above wherein a conveyor belt formed as a closed loop is driven at one point by an elongate cogged drive shaft and is maintained in proper belt tension a spring loaded idler shaft. In addition, a pair of guide rollers are included to direct the conveyor assembly in an appropriate circuit for the intended purpose. The device includes orienting the belts in spaced parallel fashion, driven in concert and passing below a vibrator which separates the fruit from the vines. This allows the fruit to pass between adjacent spaced conveyor belts while carrying the vines for subsequent deployment along the harvested terrain. The vines are removed from fingers on the conveyor by a slotted shield which removes the entrained vines from the fingers so that the conveyor belt can pass to the drive roller relatively free of contamination by the vines.

Other objects Will be made manifest when considering the detailed specification when taken in conjunction with the appended drawing figures.

BRIEF DESCRIPTION OF THE DRAWING FIGURES

BRIEF DESCRIPTION OF THE PREFERRED EMBODIMENT

Figure 1:
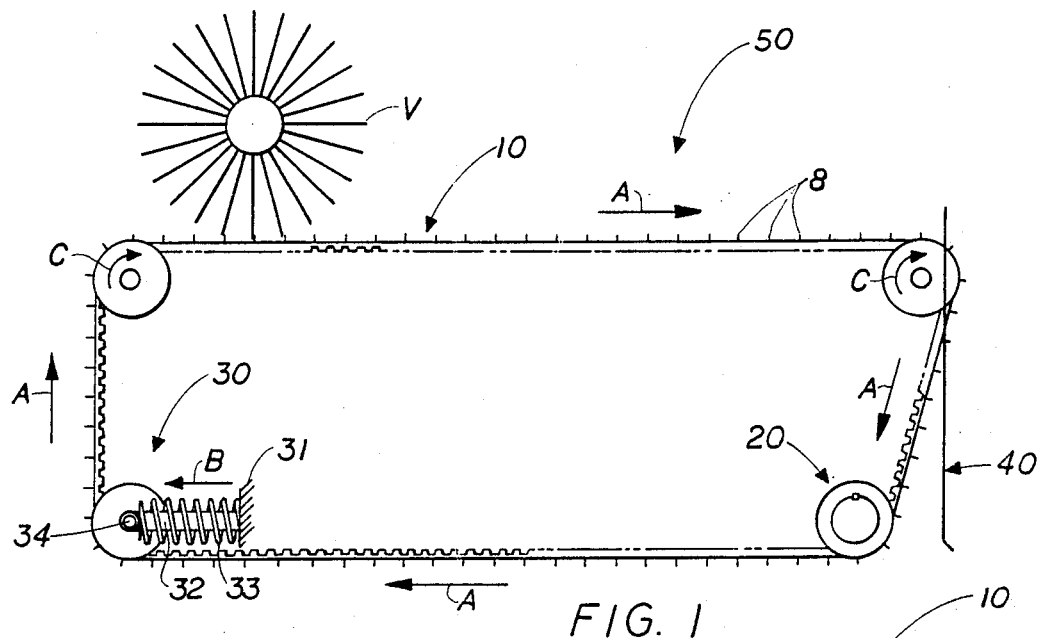
FIG. 1 is a side view of the apparatus according to the present invention.

Referring to the drawings now, wherein like reference numerals refer the like parts throughout the various drawing figures, reference numeral 10 is directed to the conveyor belt according to the present invention, 20 to the drive shaft, 30 to the means for adjusting belt tension, 40 to the slotted shield which removes entrained debris from a series of belts operating in concert and reference numeral 50 is generally directed to the conveyor system according to the present invention.

More particularly, and with specific reference to FIGS. 1 and 2, the conveyor belt 10 forms a closed loop having a splice detail discussed hereinafter. The inner surface of the belt 10 includes a plurality of upwardly extending crenels 1 separated one from another by a plurality of merlons 2 thereby defining a saw tooth configuration which serves as the tractive force when coupled with a complimentally formed drive shaft 20 to be described hereinafter. The conveyor belt 10 has on an outer surface a plurality of resilient fingers 8 outwardly extending around the periphery of the belt. These 8 fingers engage the vines associated with the plant and carry the vines along the length of the conveyor 10 to be ultimately dumped on the already harvested ground.

Figure 2:
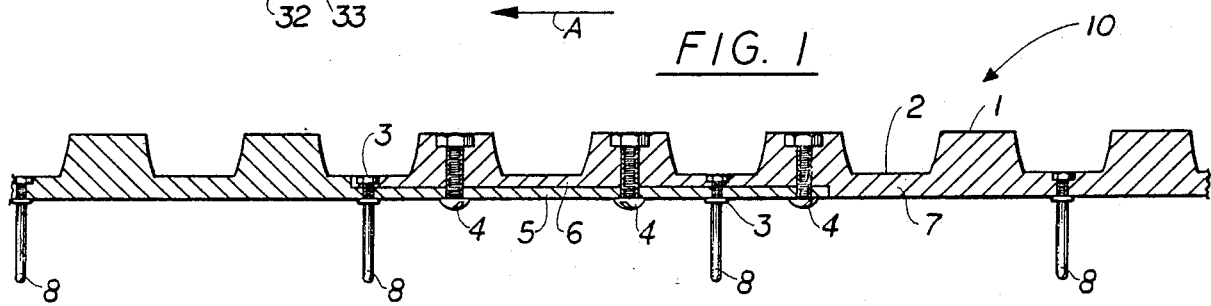
FIG. 2 is a detail of the conveyor belt showing a splice detail as well as the belt geometry.
Figure 3:
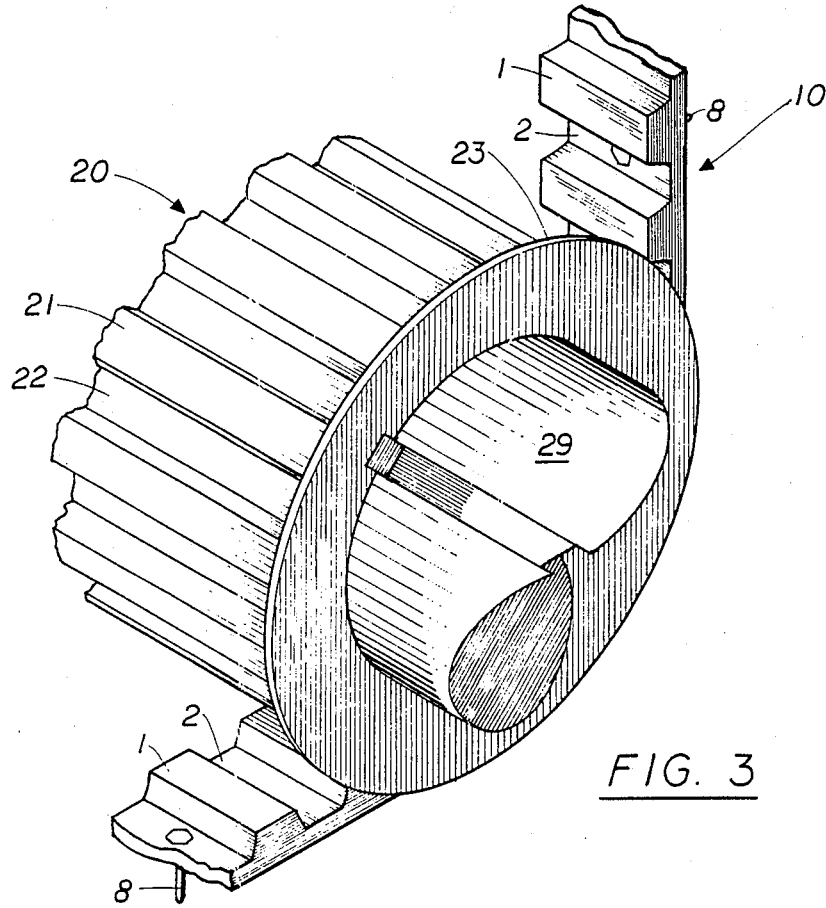
FIG. 3 is a detail of the drive roller having a plurality of cogs thereon according to the present invention.

FIG. 2 shows the overall thickness of the conveyor belt as reference numeral 7. A splice overlaps free ends 5, 6 of the belt. Free end 6 underlies the crenels 1 and is thinner than thickness 7. Free end 5 overlies fingers 8 and a conveyor belt portion of conventional thickness to be spliced with free end 6. Thus, to unite the belt the free end 5 is bonded to the free end 6 forming the resultant thickness 7. The free ends 5 and 6 are interconnected by fasteners. The fasteners may take the form of a complimentally formed nut and bolt 3 which passes through the belt where the merlons 2 are located. Alternatively, the fasteners 4 may take the form of nuts and complimentally formed bolts which pass through the belt where the crenels 1 are located. For example, the belt could be integrally formed by vulcanization. In addition, the nut and bolt arrangement can be replaced with rivets or any other known fastener as should be deemed expedient. The resilient fingers 8 are provided with a threaded end which passes through the belt and is fastened thereto by means of a nut.

Attention is now directed to the drive shaft 20 Drive shaft 20 has a plurality of teeth 21 radially extending and separated one from the other by interposed gaps 22. The spacing and configuration of the teeth 21 and gaps 22 mesh with the merlon 2 and crenel 1 structure of the conveyor belt 10 to provide positive drive and a self cleaning action. Entrained debris, vines or the like will not be allowed to accumulate or build up on the area of interconnection of the drive shaft 20 and the belt 10. The drive shaft 20 includes a flange 23 on drive shaft extremeties. A centrally disposed drive axle 24 may be driven through either a hydraulic system or a chain drive and sprocket assembly (not shown).

FIG. 1 reflects a tension roller 30 located in a lower forward position with respect to the entire conveyor system 50. More particularly, the tension roller 30 is carried on a machine support 31 in which its shaft axle 34 is capable of translating along a slide 32 configured to receive the axle 34 within. The axle 34 is pushed away from the machine support 31 by means of a spring 33 so that appropriate spring tension is placed on the conveyor belt 10.

Figure 4:
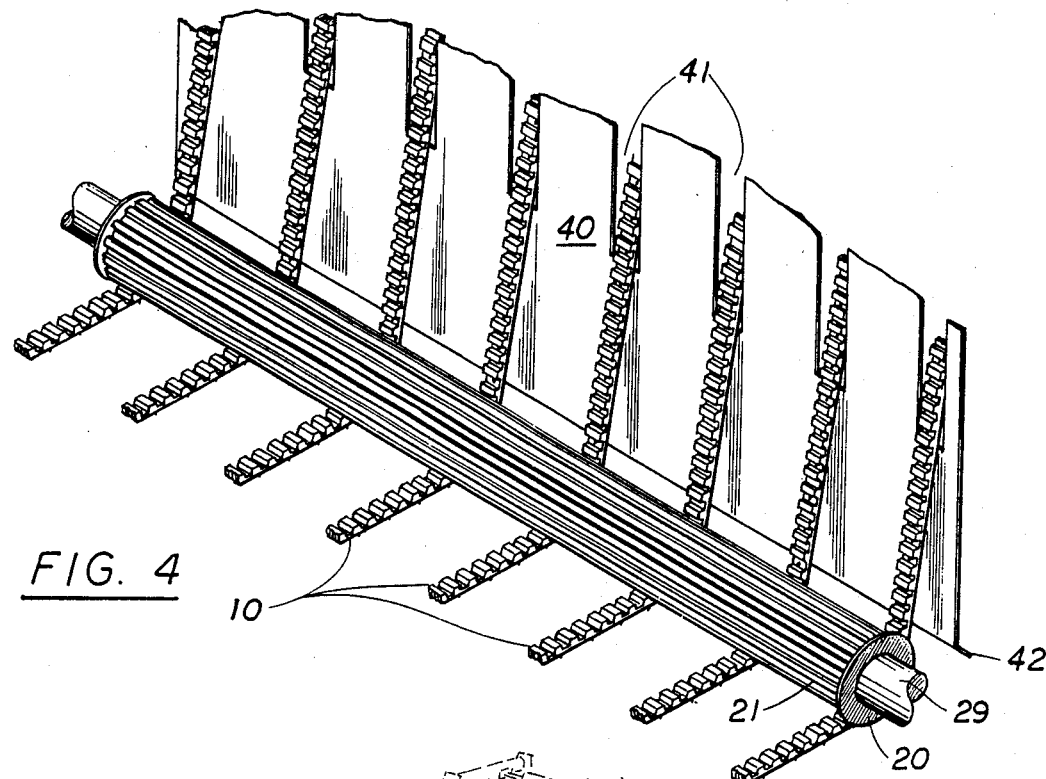
FIG. 4 is a view similar to FIG. 3 but shows a plurality of the belts operating in concert.

A rear portion of the conveyor system 50 reveals a slotted shield in FIG. 4. The slotted shield 40 includes a plurality of slots 41 through which the several belts 10 pass. Free ends 42 of the slotted shield 40 are carried in a substantially vertical plane so that when the belt declinates downwardly and inwardly with respect to the shield debris is forced off the resilient fingers 8 and is discharged onto the ground by the machine.

Figure 5:
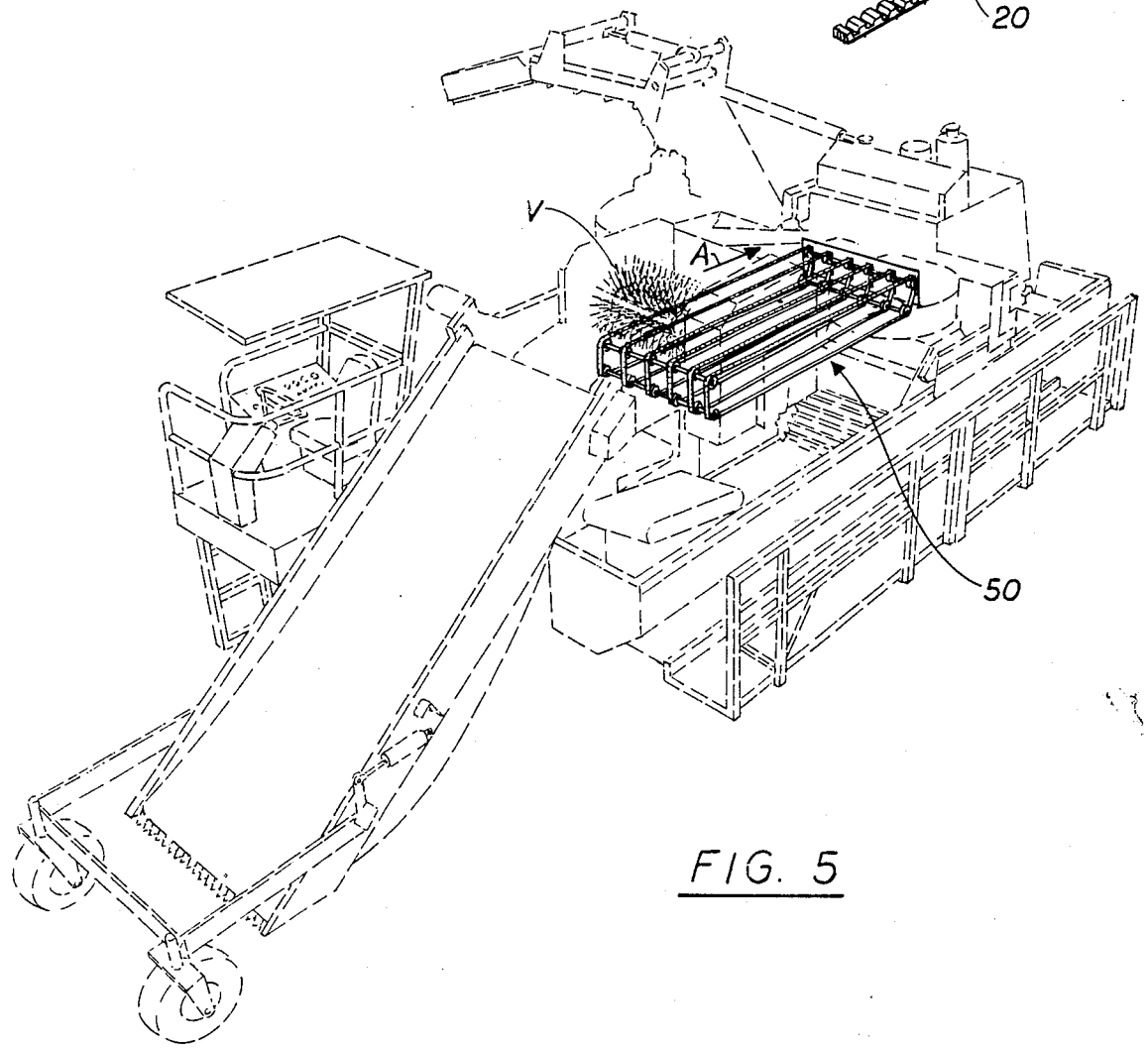
FIG. 5 is a perspective of the apparatus in its intended environment.

An overview of the conveyor system shown in FIG. 1 reveals that a total of four rollers are employed. The drive roller 20 is placed inboard from what would constitute a rectangular pattern when considering the remaining three rollers. This allows the roller 20 to benefit from the effect of the belt passing through the slotted shield 40. The belt travels in the direction of the arrow A and the belt is maintained under spring tension by the spring roller 30 which causes tension of that roller in the direction of the arrow B. All of the rollers, including the topmost rollers move in a clockwise direction along the arrow C. The operation with respect to harvesting and separating the crop from the vines can now be explored with reference to FIG. 5.

A vibrator V of conventional known manufacture overlies a top surface of the conveyor assembly 50 along the two topmost rollers. The vibrating action associated with the vibrator V is intended to separate the tomatoes from the vines. The tomatoes pass between adjacent conveyor belts 10 along the top horizontal portion of the conveyor system 50. The vines, however are entrained by the resilient fingers 8 that travel along the direction of the arrows A to the rear portion of the machine. When the vine encounters the slotted shield 40 the vines are directed to the ground while the plural conveyor belts 10 are redirected to the drive roller 20 as has been described.

In view of the foregoing, it should be apparent that a conveyor system has been provided which, due to its structural detail provides positive drive and durability. Although various structural details were enumerated and depicted in substantial detail, it should be apparent that numerous structural modifications and adaptations may be resorted to without departing from the spirit of the invention as delineated hereinabove and as claimed hereinbelow.

I claim:

1. In a harvester which picks up produce-laden vines and separates the vines from the produce,
   wherein the harvester includes a vibrating tined wheel under which a first conveyor passes, said first conveyor carrying the vines and produce such that the vibrating wheel contacts the vines and dislodges the produce therefrom,
   said first conveyor formed from: a plurality of flexible belts laterally spaced-apart sufficiently to let produce pass there between,
   each belt having an outer surface formed with a plurality of outwardly extending fingers along the belt's length to capture the vines thereon,
   each belt having an inner surface formed with a belt driving means configured as a series of merlons and crenels which each extend uninterrupted along the belt's entire width,
   drive means contacting said belt's merlons and crenels to move all said belts in synchrony and said drive means defining a preclusion means to prevent build up of debris such as vines, produce, dirt or other field contaminants between said drive means and said belts.

2. The harvester of claim 1 wherein said debris preclusion means further includes clearance on said drive means to allow the debris to be pushed away from the area of engagement of said belt and said drive means.

3. The harvester of claim 2 including means to preclude gross lateral belt wandering whereby said plural belts maintain a fixed spaced relation to allow the through passage of produce.

4. The harvester of claim 3 including means to extract a majority of the vines captured by said fingers prior to said belts' contacting said drive means.

5. The device of claim 4 wherein said drive means is embodied as a shaft having alternating teeth and gaps complementally formed to engage and drive said merlons and crenels.

6. The device of claim 5 wherein said conveyor belt is formed from a multiply laminate, and said belt is formed as a closed loop by means of splicing.

7. The device of claim 6 wherein said splicing means includes said conveyor belt having a certain thickness, one free end of said conveyor having a bottom strip, another free end of said conveyor belt having a top strip, said bottom and top strips placed in under and overlying respective registry so that the resulting thickness of said belt can be achieved and,
   means for fastening said bottom and top strips to splice said belt fee ends together.

8. The device of claim 7 wherein said fastening means comprises nuts and bolts.

9. The device of claim 7 wherein said fastening means comprise rivets.

10. The device of claim 8 wherein said fingers are attached to an outer exposed surface of said conveyor belt by means of a threaded connection passing through said conveyor belt.

11. The device of claim 10 wherein said harvester includes said drive shaft, a plurality of idler rollers, and a tensioning roller for removing slack in said conveyor belts.

12. In a harvester which picks up produce-laden vines and separates the vines from the produce,
    wherein the harvester includes a vibrating tined wheel under which a first conveyor passes, said first conveyor carrying the vines and produce such that the vibrating wheel contacts the vines and dislodges the produce therefrom,
    said first conveyor formed from: a plurality of flexible belts laterally spaced-apart sufficiently to let produce pass there between,
    each belt having an outer surface formed with a plurality of outwardly extending fingers along the belt's length which capture the vines thereon,
    each belt having an inner surface formed with a belt driving means configured as a series of merlons and crenels which each extend uninterrupted along the belt's entire width,
    drive means contacting said belt's merlons and crenels to move all said belts in synchrony,
    and means to preclude gross lateral belt wandering whereby said plural belts maintain a fixed spaced relation to allow the through passage of produce.

13. The harvester of claim 12 wherein said means to preclude gross lateral wandering of said belts includes a shield disposed just upstream of said drive means and a plurality of slots passing through said shield, one said slot aligned for each said belt which passes therethrough.

14. The harvester of claim 13 including means to extract a majority of the vines captured by said fingers prior to said belts' contacting said drive means.

15. The device of claim 14 wherein said drive means is embodied as a shaft having alternating teeth and gaps complementally formed to engage and drive said merlons and crenels.

16. The device of claim 15 wherein said conveyor belt is formed from a multiply laminate, and said belt is formed as a closed loop by means of splicing.

17. The device of claim 16 wherein said splicing means includes said conveyor belt having a certain thickness, one free end of said conveyor having a bottom strip, another free end of said conveyor belt having a top strip, said bottom and top strips placed in under and overlying respective registry so that the resulting thickness of said belt can be achieved and,
    means for fastening said bottom and top strips to splice said belt free ends together.

18. The device of claim 17 wherein said fastening means comprise nuts and bolts.

19. The device of claim 17 wherein said fastening means comprise rivets.

20. The device of claim 18 wherein said fingers are attached to an outer exposed surface of said conveyor belt by means of a threaded connection passing through said conveyor belt.

21. The device of claim 20 wherein said first conveyor includes said drive shaft, a plurality of idler rollers, and a tensioning roller for removing slack in said conveyor belts.

22. In a harvester which picks up produce-laden vines and separates the vines from the produce, wherein the harvester includes a vibrating tined wheel under which a first conveyor passes, said first conveyor carrying the vines and produce such that the vibrating wheel contacts the vines and dislodges the produce therefrom, said first conveyor formed from: a plurality of flexible belts laterally spaced-apart sufficiently to let produce pass there between, each belt having an outer surface formed with a plurality of outwardly extending fingers along the belt's length which capture the vines thereon, each belt having an inner surface formed with a belt driving means configured as a series of merlons and crenels which each extend uninterrupted along the belt's entire width, drive means contacting said belt's merlons and crenels to move all said belts in synchrony, and means to extract a majority of the vines captured by said fingers prior to said belt's contacting said drive means.

23. The harvester of claim 22 wherein said extraction means includes a shield having slots, wherein said belts pass through said slots on said shield upstream from said drive means, said shield defining an abutment surface against which the vines contact, removing the vines from said fingers.

24. The device of claim 23 where said slots include side edges which preclude gross lateral belt wandering whereby said plural belts maintain a fixed spaced relation to allow the through passage of produce.

25. The device of claim 24 including a debris preclusion means to prevent build up of debris such as vines, produce, dirt or other field contaminants between said drive means and said belts.

26. The device of claim 25 wherein said debris preclusion means is embodied as a shaft having alternating teeth and gaps complementally formed to engage and drive said merlons and crenels, which operates by squeezing and throwing debris out from areas of belt contact with said drive means.

27. The device of claim 26 wherein said conveyor belt is formed from a multiply laminate, and said belt is formed as a closed loop by means of splicing.

28. The device of claim 27 wherein said splicing means includes said conveyor belt having a certain thickness, one free end of said conveyor having a bottom strip, another free end of said conveyor belt having a top strip, said bottom and top strips placed in under and overlying respective registry so that the resulting thickness of said belt can be achieved and, means for fastening said bottom and top strips to splice said belt free ends together.

29. The device of claim 28 wherein said fastening means comprise nuts and bolts.

30. The device of claim 28 wherein said fastening means comprises rivets.

31. The device of claim 28 wherein said fingers are attached to an outer exposed surface of said conveyor belt by means of a threaded connection passing through said conveyor belt.

32. The device of claim 31 wherein said harvester conveyor system includes said drive shaft, a plurality of idler rollers, and a tensioning roller for removing slack in said conveyor belts.

33. A drive belt kit for converting a harvester's conveyor belt system which separates produce from its vines, the kit including:

a plurality of belts each having a first surface from which a plurality of vine grasping fingers extend, a second belt drive surface configured as a plurality of merlons and crenels which extend the entire width of said belts, transverse to the belts' direction of travel, a drive means having a drive surface formed from teeth and gaps complemental to said merlons and crenels thereby providing self-cleaning between said belt and said drive means by forcing debris associated with harvesting away from said belt drive surfaces.

34. The kit of claim 33 including a slotted shield upstream from said drive means, wherein slots on said shield serve as guides for said belts and said shield pulls entrained debris off said fingers as said belts pass through said slots.

* * * * *

REEXAMINATION CERTIFICATE (2503rd)
United States Patent [19]

Hilleby

[11] B1 4,884,393

[45] Certificate Issued Mar. 14, 1995

[54] CONVEYOR SYSTEM FOR USE PARTICULARLY WITH HARVESTERS

[75] Inventor: Hakan K. Hilleby, Woodland, Calif.

[73] Assignee: Hilleby International, Inc., Woodland, Calif.

Reexamination Request:
No. 90/003,039, Apr. 30, 1993

Reexamination Certificate for:
Patent No.: 4,884,393
Issued: Dec. 5, 1989
Appl. No.: 136,958
Filed: Dec. 23, 1987

[51] Int. Cl.$^6$ .......................................... A01D 46/00
[52] U.S. Cl. ............................ 56/327.1; 56/328.1; 198/834; 198/844
[58] Field of Search .............. 56/327.1, 328.1, 364, 56/13.9, 49; 198/814, 817, 832, 834, 844, 847, 799, 803.3; 209/685; 474/202, 203, 204, 249, 250, 251, 252

[56] References Cited

U.S. PATENT DOCUMENTS

| | | | |
|---|---|---|---|
| 2,799,177 | 7/1957 | Henson | 198/847 |
| 3,618,617 | 11/1971 | Gates et al. | 171/27 |
| 4,072,062 | 2/1978 | Morling et al. | 198/834 |
| 4,174,755 | 11/1979 | Siri | 171/27 |
| 4,262,750 | 4/1981 | Merkley et al. | 56/327.1 |
| 4,327,542 | 5/1982 | VanGinhoven | 56/98 |
| 4,335,570 | 6/1982 | Fitzmaurice | 56/327.1 |
| 4,337,612 | 7/1982 | Dean et al. | 56/98 |
| 4,569,188 | 2/1986 | Alper et al. | 56/327.1 |
| 4,741,432 | 5/1988 | Dekko | 474/204 |
| 4,805,388 | 2/1989 | Kell | 56/98 |
| 4,889,868 | 2/1990 | Johnson | 198/520 |

FOREIGN PATENT DOCUMENTS

| | | | |
|---|---|---|---|
| 103950 | 6/1982 | Japan | 474/204 |
| 1230519 | 5/1986 | U.S.S.R. | 56/327.1 |

OTHER PUBLICATIONS

Noffsinger Mfg. Co., Inc. "Belt and Hook Chain, Steel Wire Grading Belt for the Harvesting and Processing Industry," 1985.

Wevea B.V. "Harvester Webbing for Agriculture," 1983.

FMC Corporation "Service Manual Tomato Harvester Model 5600 and 5600TE," 1986.

*Primary Examiner*—Terry Lee Melius

[57] ABSTRACT

A conveyor system used in fruit or crop harvesters to facilitate separation of the fruit or crop vine from the fruit or crop including a plurality of laterally spaced conveyor belts having an inner surface contoured with merlons and crenels to be engaged by a drive shaft having complimentally formed teeth and gaps to drive by meshing engagement with the merlons and crenels. The conveyor belt is formed as a closed loop including a plurality of idler rollers and a tensioning roller which with the drive shaft forms a closed loop. The interrelationship of the belt and the drive shaft preclude vine or organic matter build-up to minimize belt slippage and synchronous movement of all the belts.

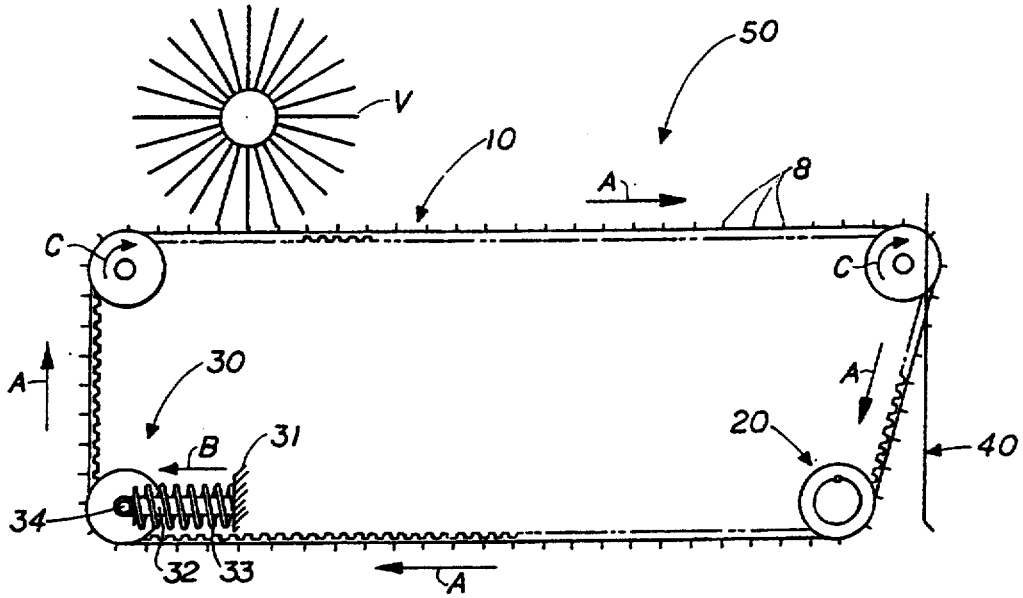

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 3, 12 and 13 is confirmed.

Claims 4-11, 14-32 and 34 were previously disclaimed.

Claim 33 is cancelled.

New claims 35 and 36 are added and determined to be patentable.

*35. The harvester of claim 1 wherein the belts of the first conveyor are free of transverse connecting links.*

*36. The harvester of claim 12 wherein the belts of the first conveyor are free of transverse connecting links.*

* * * * *